G. M. McMAHAN.
CAR-COUPLING.

No. 192,776. Patented July 3, 1877.

Witnesses:
Fred Haynes
E. B. Sperry

G. M. McMahon
his Attorneys
Brown & Allen

UNITED STATES PATENT OFFICE.

GEORGE M. McMAHAN, OF CARTER'S CREEK STATION, TENNESSEE, ASSIGNOR OF ONE-HALF HIS RIGHT TO SNOWDEN K. HATHAWAY, OF SAME PLACE.

IMPROVEMENT IN CAR-COUPLINGS.

Specification forming part of Letters Patent No. 192,776, dated July 3, 1877; application filed May 14, 1877.

*To all whom it may concern:*

Be it known that I, GEORGE M. McMAHAN, of Carter's Creek Station, in the county of Maury and State of Tennessee, have invented certain Improvements in Car-Couplings; and I do hereby declare that the following is a full, clear, and exact description of the same, reference being had to the accompanying drawing, forming part of this specification.

My invention supplies a safe, convenient, and simple means for coupling and uncoupling railway-cars, obviating all danger of injury in passing between cars to be coupled or uncoupled, as both these operations are performed by the operator while standing at the side of the cars. The coupling is also adapted to the coupling of a car to another car having the old style of link-and-pin coupling without requiring the operator to enter between the cars.

The invention consists in combinations of devices for operating the coupling-pin for coupling two cars, both having my improved coupling attached thereto, or for coupling a car having my improved coupling device with another car having the ordinary draw-bar, draw-head, and link-and-pin coupling.

Figure 1:
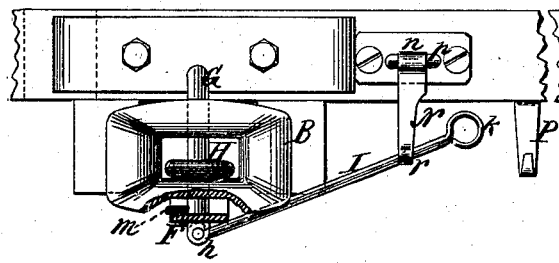
Figure 2:
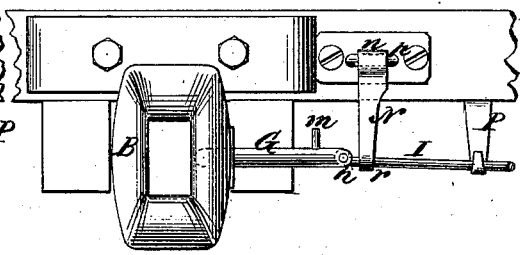
Figure 3:
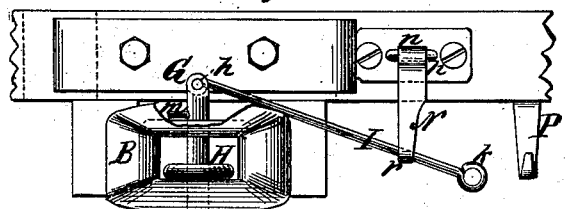
Figure 5:
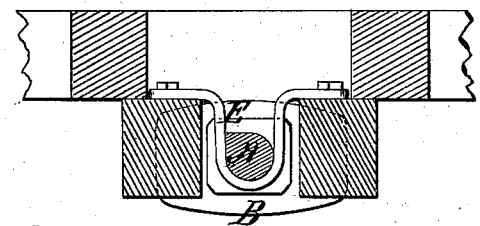
Figure 4:
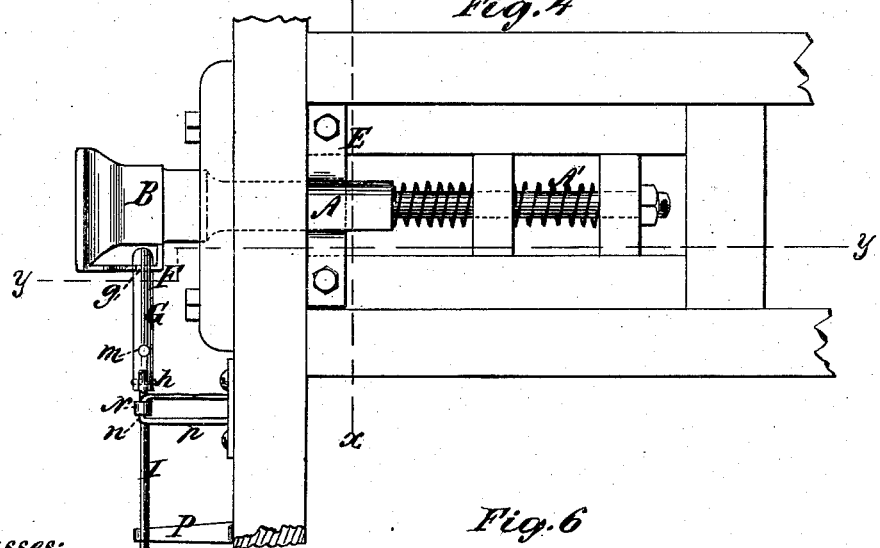
Figure 6:
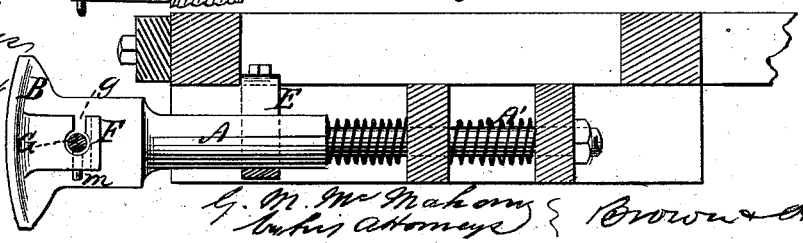

Figure 1 in the accompanying drawing is a front-end view of a portion of a floor-frame of a car and my improved coupling thereunto attached, the parts being shown in the position occupied by them when a car having my improved coupling is coupled to another car also having such a coupling thereunto attached. Fig. 2 is a front-end view of the same, the parts being in the position occupied when the cars are uncoupled. Fig. 3 is a front-end view of the same, the parts being arranged in the position occupied when a car having my improved coupling is coupled to a car having the old style of draw-bar, link-and-pin coupling. Fig. 4 is a top view of a portion of the floor-frame of a car with my improved car-coupling thereunto attached, the parts being in position as when the cars are uncoupled. Fig. 5 is a vertical cross-section on the line *x x* in Fig. 4. Fig. 6 is a vertical longitudinal section on the line *y y* in Fig. 4.

A A', Figs. 4, 5, and 6, is the draw-bar, upon which is formed the draw-head B. Said draw-bar A A' does not differ materially from the ordinary draw-bar, except that the part A of the same has the cross-section shown in Fig. 5—that is to say, two sides of the said cross-section are flat surfaces at, or nearly at, right angles with each other, and the remainder of the section is circular.

To the floor-frame C of the car I attach a stirrup, E, the lower part of which is formed on a circle corresponding with the cylindrical side of the part A of the draw-bar A A'. The vertical sides of said stirrup are straight, and the part A of the draw-bar which passes through said stirrup, and is thereby supported, can only turn one-quarter of a rotation in said stirrup, the flat sides of the said part A of said draw-bar abutting against the flat vertical sides of said stirrup, to prevent said draw-bar from any further rotation.

The said quarter-rotation of the draw-bar permits the draw-head B to be turned into either of the positions shown in Figs. 1 and 2, in the manner and for the purposes hereinafter described.

On the under side of the draw-head I form or attach the slotted locking-plate F, Figs. 1, 4, and 6, the ends of said plate being, respectively, joined to the body and under lip of the said draw-head. The coupling-pin G passes through the draw-head B, link H, Figs. 1 and 3, and through the said locking-plate F, as shown in Figs. 1, 3, and 6, for coupling two cars together. To the end of the said coupling-pin G, I join, by a pivot, *h*, the rod I, upon which is preferably formed the handle *k*. Near the pivot *h*, I insert in the coupling-pin G, preferably at a right angle with said pivot, the locking-pin *m*.

To the end sill of the floor-frame of the car, about midway between the draw-bar and the outside of said frame, I attach a swinging stop-support, N, Figs. 1, 2, 3, and 4. Said support is pivoted, at *n*, to a horizontal support, *p*, attached to the floor-frame in such manner that it may swing vertically in a plane parallel with the central longitudinal axis of the draw-bar, but cannot swing in any other direction. Between said horizontal support $p$ and the outside of the floor-frame, and preferably to the front sill of said frame, I rigidly attach the hook-support P, which extends forward to bring the hook part of the same in line horizontally and vertically with the center of the draw-head, and with an eye, $r$, in the end of the swinging stop-support N, through which the rod I loosely passes.

The operation of the parts is as follows: The draw-heads, when the same are uncoupled, occupy the position shown in Figs. 2, 4, and 6. When two cars having thereon my improved coupling are brought together, the free end of the link enters one or the other coupling, with its sides in a vertical or nearly in a vertical plane; and as the thickness of the link is much smaller proportionately to the extent of the opening in the draw-head in this position than the width of said link is to the extent of said opening in the ordinary position, it enters the draw-head more freely, and with much less liability to distortion or breakage, than when the link enters the draw-head in the usual manner.

When the link has entered the draw-head, the operator, standing at the side of the car, takes hold of the handle $k$ on the rod I, (held in line with the coupling-pin by the supports N and P,) and turns it on its horizontal axis till the locking-pin $m$, projecting from the coupling G, is in line with the slot $g$ in the locking-plate F, as shown in Fig. 4. Then, thrusting said rod I and its attached coupling-pin inward, he passes said coupling-pin through the draw-head B and the link H. Then, turning the rod I and the attached coupling-pin on their longitudinal axis to bring the locking-pin $m$ under the locking-plate F, as shown in Figs. 1 and 6, raising slightly the handle $k$ of the rod I, and thrusting said rod still farther inward, he turns the draw-head B into the position shown in Fig. 1. In this position the rod I prevents the coupling-pin G from turning on its vertical axis, and the locking-pin $m$ holds the coupling-pin securely.

The uncoupling is performed by exactly reversing the operation of coupling, the outer end of the coupling-pin abutting against the support N, which prevents the coupling-pin from being entirely withdrawn from the draw-head except by a manipulation hereinafter described.

The said coupling-pin is never required to be withdrawn from the draw-head except when adjusting the coupling for use with the old style of draw-head and coupling, which is performed in the following manner: The parts are all first brought into the position which uncouples the draw-heads, as shown in Fig. 2, and as hereinbefore described, by reversing the movements necessary to perform the coupling. The swinging stop-support N is next swung forward and upward till the point of the coupling-pin G is freed from its engagement with the locking-plate F. The draw-head B is then turned back into its normal position, as shown in Fig. 3. The rod I may then be used as a hand-lever to withdraw the said coupling-pin from the draw-head, or to insert the said pin from the top, as usual, but without requiring the operator to enter between the cars.

I thus supply a simple, safe, self-locking coupling, which, while retaining all the advantages of the link-and-pin coupling, obviates all the disadvantages of the same; the coupling being not only capable of use with like couplings, but equally so with the old style of coupling—a very important advantage over other safety-couplings.

I claim—

1. The combination, with the draw-bar A A', constructed and operating substantially as described, of the removable coupling-pin G and the rod I, pivoted to said pin for removing said pin from and replacing the same in the link, and for turning the draw-head, substantially as and for the purpose described.

2. The combination, with the draw-head B and coupling-pin G, of the locking-plate F, formed on said draw-head, and the locking-pin $m$, projecting from the coupling-pin, substantially as and for the purpose set forth.

3. The combination, with the turning draw-head B, draw-bar A A', and removable coupling-pin G, having the rod I pivoted thereto, of the swinging stop-support N, whereby the said coupling-pin may be withdrawn and inserted in the draw-head from above, for use in connection with an ordinary car-coupling, substantially as and for the purpose specified.

4. The combination of the swinging stop-support, the locking-plate F, and the hook-support P, for keeping the rod I and coupling-pin G in line with each other, substantially as described.

G. M. McMAHAN.

Witnesses:
D. M. TISDALE,
S. B. CAFUTON.